US008663516B2

(12) United States Patent
Filali

(10) Patent No.: US 8,663,516 B2
(45) Date of Patent: Mar. 4, 2014

(54) PROCESS FOR MANUFACTURING A BLOCK OF MATERIAL THAT IMITATES NATURAL STONE AND THE BLOCK OF MATERIAL OBTAINED BY THE IMPLEMENTATION THEREOF

(76) Inventor: Maussa Filali, Strasbourg (FR)

( * ) Notice: Subject to any disclaimer, the term of this patent is extended or adjusted under 35 U.S.C. 154(b) by 189 days.

(21) Appl. No.: 13/139,538

(22) PCT Filed: Nov. 30, 2009

(86) PCT No.: PCT/FR2009/001358
§ 371 (c)(1),
(2), (4) Date: Jun. 14, 2011

(87) PCT Pub. No.: WO2010/076404
PCT Pub. Date: Jul. 8, 2010

(65) Prior Publication Data
US 2011/0248419 A1    Oct. 13, 2011

(30) Foreign Application Priority Data

Dec. 19, 2008    (FR) ..................................... 08 07178

(51) Int. Cl.
*B29C 41/22*    (2006.01)
(52) U.S. Cl.
USPC .......... 264/73; 423/419.1; 52/294; 204/157.5
(58) Field of Classification Search
USPC ................. 52/294; 423/419.1–432; 106/38.2; 264/73; 204/157.4, 157.47, 157.5
See application file for complete search history.

(56) References Cited

U.S. PATENT DOCUMENTS

| 2,348,614 | A | 5/1944 | Dinkfeld et al. |
| 3,417,172 | A | 12/1968 | Rostoker |
| 5,637,412 | A | 6/1997 | Jennings et al. |
| 6,750,283 | B1 * | 6/2004 | Sakai et al. .................... 524/492 |

FOREIGN PATENT DOCUMENTS

| DE | 578 389 | | 6/1933 |
| EP | 0282591 | * | 9/1986 |
| EP | 0 282 591 | A1 | 9/1988 |
| EP | 0 445 301 | A1 | 9/1991 |
| FR | 524363 | * | 9/1920 |
| FR | 524 363 | | 9/1921 |
| FR | 2 672 535 | A1 | 8/1992 |
| GB | 1 603 405 | | 11/1981 |
| WO | 85/00587 | A1 | 2/1985 |
| WO | 94/27797 | A1 | 12/1994 |
| WO | 00/01640 | A1 | 1/2000 |

OTHER PUBLICATIONS

Machine translation of EP0282591 (1986).*
Human translation of FR524363 (1920).*
Gettwert, G., et al.; "One-component sificate binder systems for coatings"; Surface Coatings {nlemationd 1998 (I 2).*

* cited by examiner

*Primary Examiner* — Stuart Hendrickson
*Assistant Examiner* — Richard M Rump
(74) *Attorney, Agent, or Firm* — Davis & Bujold, PLLC; Michael J. Bujold

(57) ABSTRACT

A process for manufacturing a block of material that imitates natural stone. The manufactured stone not only looks and appears like natural stone, but is also consistent with the composition of natural stone. The process comprises forming an aqueous mixture of limestone aggregates, treating the mixture with carbon dioxide under pressure and then highly compressing the treated mixture in a sealed mold. This process recreates the endogenous matrix of the natural stone and its original composition. The block of material is intended for construction and decoration purposes.

20 Claims, No Drawings

PROCESS FOR MANUFACTURING A BLOCK OF MATERIAL THAT IMITATES NATURAL STONE AND THE BLOCK OF MATERIAL OBTAINED BY THE IMPLEMENTATION THEREOF

This application is a National Stage completion of PCT/FR2009/001358 filed Nov. 30, 2009, which claims priority from French patent application serial no. 0807178 filed Dec. 19, 2008.

BACKGROUND OF THE INVENTION

The problem to be solved is that the processes for manufacturing a block of material that imitates natural stone use at least one chemical binder among cement, lime, plaster, various polymerizable glues or resins or various reactive acids.

But these binders, which can be found in the final composition of the block of material, do not exist in the natural original stone that is imitated. For example, the process described in patent FR2672535 uses at least one of these binders.

Therefore, a person skilled in the art can easily recognize the authenticity of a natural stone produced in a quarry with respect to a block of material reconstructed using these processes. The imitation is not satisfactory.

The natural stone most commonly used for construction is derived from lime or sandstone, it is a metamorphic rock. This means that it is a sedimentary rock produced by the compaction, the solubilisation, the deformation, the recrystallisation and the dehydration of materials transported in the form of particles dissolved or in suspension in the water. The formation of the lime or of the sandstone takes place over thousands of years, under the combined influence of pressure, temperature variations and solubility in water. The lime is mainly made of calcium carbonate and magnesium carbonate. The carbonic gas dissolved in the rain water percolates through the geological layers. It reacts with the calcium or magnesium carbonate and forms the calcium or magnesium bicarbonate, which is more soluble in water. When it recrystallizes in the form of carbonate, it seals the adjacent calcareous or siliceous sand grains to form a continuous block of stone.

This complex process forms the endogenous binder of the natural stone.

For the noble construction of mansion houses or architectural buildings, the materials used are natural stones produced in the quarries. In this case, the problem to be solved is that this extraction requires the use of heavy sawing and operation means, with important material losses. Furthermore, the transport, handling and laying of these natural stones for this type of construction require a qualified workforce, which is both rare and expensive.

SUMMARY OF THE INVENTION

The present invention aims to overcome all these disadvantages. The invention relates to a process for manufacturing building material having the shape and appearance of a carved natural stone coming from a quarry. The particular feature of this invention is that not only does it reproduce the look and appearance of the natural stone that is imitated, but also its consistency and its composition.

The process of the present invention reproduces the process of the natural formation of the stone in its reaction principle, in a sufficiently shortened time to allow its industrial reproduction. This invention thus allows reproducing the regional natural stone according to the regional origin of the sand and of the quarry granulates.

Unlike other methods, this invention does not use chemical binders: no cement, no lime, no plaster, no glue, no resin. This invention only uses the endogenous binder to reproduce the natural stone carved in a quarry. The composition of the block of material produced is exactly identical with that of the imitated natural stone. For example, it is possible to reproduce a block of material from waste granulate and sand from the same quarry.

The present invention requires no cuts, no handling with heavy means and no intervention of qualified workforce for the laying. This invention relates to a modular construction block that can easily be used with the help of a construction plan.

So, this invention allows producing any type of blocks for the construction of houses, buildings, walls, small fencing walls, garden sheds, of blocks for producing window frames or door frames, of blocks for floor pavements, roofing and façade coverage elements, civil engineering works elements, kerbstones, bridge building elements, railway sleepers, but also elements for interior decoration, wash basins, sinks, bidets, pans and bathtubs, and for external decoration, statues or funerary monuments.

The present invention relates to the process for manufacturing under constraint a block of material in a sealed mold and to the produced material.

The process for manufacturing a block of material for construction comprises the following steps:
  Mix aggregates containing calcium carbonate or magnesium carbonate and water to obtain an aqueous mix
  Transfer this aqueous mix in a pressurized, hermetically sealed reactor
  Introduce acid gas or gas produced by means of an acid in said reactor in order to form in part or totally calcium or magnesium bicarbonate so as to obtain a reaction product,
  Transfer said reaction product in a mold comprising a set of vents and increase gradually the compression pressure in the mold
  Depressurize progressively the mold and extract the block of material.

DETAILED DESCRIPTION OF THE PREFERRED EMBODIMENTS

Composition

The present invention uses the discards and waste produced by the cutting and carving of the limestone blocks of the quarries to produce a block of reconstructed material. The limestone material quarries produce stones cut at the required dimensions and the neighboring lime factories produce lime by high-temperature calcination. These two activities produce waste material with a size 0-30, that is to say that they are industrially rejected by means of a 0 to 30 millimeter sieving. This waste thus is presented roughly in the form of coarse calcareous sand. In the neighboring lime factories, the calcination of the limestone to lime also discharges carbon dioxide, which can easily be collected and concentrated for a later use.

Process

The present invention uses ideally this limestone quarry waste and the carbon dioxide gas discharged by the lime factories in the process, which is described by means of the following steps:

For the first step, calcareous sand, mainly composed of calcium carbonate and/or magnesium carbonate, is mixed with water.

Crushing Variant

This mix is introduced in a fine-crushing system in order to obtain a wet powder of grains with an average size of the order of a micrometre, generally smaller than one millimetre. This crushing step increases the specific surface of the carbonated calcareous sand. In fact, the sum of the surfaces of the grains in contact with the water increases as the limestone grains are cracked or broken, so that the total sum of the surfaces of the new smaller but more numerous grains increases and favours the reaction by contact with the water and the dissolved species. This step is not obligatory to carry out the process according to the invention, but it improves the properties of the block of material produced.

Besides, the water is used in addition for lubricating the crushing of the grains and for capturing the dust produced by the crushing. This step produces a homogeneous thixotropic paste, which can be pumped industrially towards a pressurized reactor.

Pressurized Reaction

For the second step, the homogeneous thixotropic calcareous paste is introduced in a sealed enclosure or in a hermetically sealed pressurized reactor. In order to control better and understand better its operation, the pressurized reactor comprises at least one gas inlet valve and at least one gas bleeder valve, at least one pressure control gauge P, at least one mechanical paste mixer whose mixing speed Vmr is controlled, at least one ph-meter for monitoring the pH in the solution and at least one temperature measuring thermometer T.

The pressurized reactor is furthermore equipped industrially with an inlet for supplying the solid matter, fitted for example with an extruder pump for the homogeneous thixotropic paste, with an outlet towards the mold, fitted for example with a high-pressure extruder pump and with various supply pipes for fillers, additives and reaction products.

The carbon dioxide gas $CO_2$, for example stored in a high-pressure tank, is introduced through the inlet valve at a pressure higher than the zero pressure and dissolves in the water according to the following equations:

Dissolution of carbon dioxide in water:

$$CO_2 + H_2O \Leftrightarrow H_2CO_3 (R_1)$$

Acid reaction of the carbonic acid:

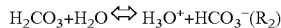
$$H_2CO_3 + H_2O \Leftrightarrow H_3O^+ + HCO_3^- (R_2)$$

The quantity of carbon dioxide dissolved depends on the gas inlet pressure

Peg and on the available water quantity. The pressure Peg is preferably higher than 4 bars and usually used between 15 and 50 bars. Increasing the carbon dioxide $CO_2$ pressure above 50 bars favours the reaction ($R_1$) and the total yield of the global reaction ($R_3$), but it increases considerably the cost of the installation.

For example, when studying the pH of a solution of carbon dioxide dissolved in pure water in function of the pressure of the carbon dioxide in equilibrium, we note that the pH reaches 1 for a pressure Peg=1 bar. The pH decreases for higher pressures to reach a threshold after 50 bars. As from the pressure of 1 bar, the pH is sufficient to realise the reaction ($R_1$) but, at this pressure of 1 bar, the yield of the reaction ($R_3$) during an industrially acceptable period of time is insufficient to produce a block of material of a good quality. Above 50 bars, taking into consideration the safety margins and the ambient temperature (0° C., +32° C.), the industrial production equipment imposes high additional costs.

The quantity of water present in the reactor is chosen as the sum of the quantity of water required for the consumption of the reaction ($R_1$), plus the quantity of water required for maintaining a sufficient quantity of carbon dioxide dissolved in the form of carbonic acid, available for the reaction ($R_3$), plus the quantity of water required for the lubrication of the homogeneous thixotropic paste.

The reaction temperature ($R_1$) is higher than 0° C. to avoid the gelation of the water. The dissolution of the carbon dioxide in the water is improved at a low temperature. On the other hand, the dissolution of the limestone, which has the same approximate formula as the metallic carbonate $MCO_3$, is easier at a tepid temperature. The preferably chosen temperature is the ambient temperature and at least 4° C.

Since the carbonic acid is corrosive, the crusher, the reactor and the mold are manufactured with steels having properties improved by acid resistance treatments Variant with the Crusher in the Reactor In a variant of the process according to the present invention, the calcareous sand crusher is located inside of the pressurized reactor in order to reduce the number of production steps, reduce the operations and maintenance on the production machines. Another advantage of locating the crusher of the first step inside of the pressurized reactor is to mix more intimately the crushed calcareous sand and the additives, in particular the metallic oxides.

A known disadvantage of this process variant is that it does not allow distinguishing the crushing time from the reaction time in the pressurized reactor. It is difficult to modify the quality of crushing independently from the yield of the reaction ($R_1$).

Carbonic Concentration Variant

In a variant of the process according to the invention, during this reaction under pressure step, the carbon dioxide can be concentrated under its hydrous form: carbonic acid. According to ($R_1$), the $CO_2$ dissolved in the water forms with the latter carbonic acid $H_2CO_3$. It is liposoluble. It can be concentrated in the dissolved lipid phase or as an emulsion in water, for example an alcohol in water. This increases strongly the solubility of the carbon dioxide. This concentrated carbon dioxide is available for the overcarbonation reaction ($R_s$) even outside of the pressurized reactor.

In another variant of the process, a similar method consists in increasing the total quantity of dissolved carbon dioxide by adding to this reactor mix a strong base, for example KOH or $K_2CO_3$, so that the created carbonic acid is transformed into potassium hydrogencarbonate $KHCO_3$, which is more stable in solution, even depressurized. The quantity of strong base added is related to the carbon dioxide pressure in the reactor. It is added so that the pH in the depressurized solution remains inside of the potassium hydrogencarbonate predominance area, between 6.37 and 10.33, and preferably close to 8.35.

Overcarbonation Reaction

According to the process of the invention, the dissolved and concentrated carbon dioxide is consumed in a reaction with the metallic carbonates according to the following equations:

Action of the carbonic acid:

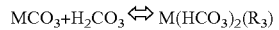
$$MCO_3 + H_2CO_3 \Leftrightarrow M(HCO_3)_2 (R_3)$$

M is an alkaline-earth element or a transition metal, chosen for example among Ca, Mg, Fe, Al, Zn, Cu $M(HCO_3)_2$: metallic hydrogencarbonate conjugate, also called metallic bicarbonate The global reaction obtained is summarized according to the following equation, the global overcarbonation reaction:

$$MCO_3 + H_2O + CO_2 \Leftrightarrow M(HCO_3)_2 \text{(Overcarbonation)}$$
$$(R_s)$$

This reaction corresponds to the metallic carbonate dissolution reaction. It is reversible and equilibrated. The increase of the carbonic gas pressure Peg increases the quantity of dissolved carbonic gas and the concentration of carbonic acid in solution. This increase shifts the equilibrium of the reaction $(R_s)$ towards the formation of metallic hydrogencarbonate. It results from this that an increase of the Peg pressure of the carbon dioxide gas $CO_2$ dissolves the metallic carbonates. The reaction $(R_s)$ corresponds to the dissolution of the metallic carbonate because the carbonic acid consumes it. It produces the metallic hydrogencarbonate conjugate $M(HCO_3)_2$ whose aqueous solubility is very high, 80 times higher than the solubility of the metallic carbonates $MCO_3$ in water. For example, a saturated solution of metallic hydrogencarbonate conjugate $M(HCO_3)_2$ contains a quantity in mass of dissolved metallic hydrogencarbonate larger than the quantity of water. This global metallic hydrogencarbonates formation reaction is called overcarbonation. The yield of this reaction $(R_3)$ conditions the quality of the block of material extracted at the end of the process.

Variant of Replacement with an Acid

In a variant of the process according to the invention applied to the formation of a block of material as described previously, the formation of the carbonic gas can be obtained by the action of an acid, for example with the general formula AH, on the metallic carbonate. In this case, the acid introduced in the pressurized reactor with the crushed calcareous sand mix reacts with the metallic carbonate to form the carbon dioxide until a pressure Peg is reached. This carbon dioxide dissolved in the form of carbonic acid reacts with another carbonate to form the metallic hydrogencarbonate. As described below, the reactions $(R_1)$ and $(R_2)$ take place according to the following equations:

$$AH + H_2O \Rightarrow H_3O^+ + A^-$$

$$2 H_3O^+ + MCO_3 \Rightarrow H_2CO_3 + M^{2+} + 2 H_2O$$

$$M^{2+} + 2A^- \Leftrightarrow MA_2 \text{(soluble salt)}$$

$$AH + MCO_3 \Leftrightarrow M(HCO_3)A$$

$$2AH + 2MCO_3 \Leftrightarrow M(HCO_3)_2 + MA_2 \text{(hydrogencarbonate)}$$

$$H_2CO_3 \Leftrightarrow H_2O + CO_2 \text{(release of gas)}$$

$$H_2CO_3 + MCO_3 \Leftrightarrow M(HCO_3)_2 \text{(hydrogencarbonate)}$$

Thus, the dissolution of the metallic carbonate under the action of the produced carbon dioxide takes place the same way as described previously. The main difference lies in the counter ion $A^-$ and in the compounds $MA_2$ and $M(HCO_3)A$ that it forms by reaction and that are found in the final composition of the block of material.

So, to justify the use of an acid AH, it must be made sure that the produced salts really exist in the composition of the imitated natural stone.

For example, sulphuric acid would be suitable for use in the process variant according to the invention if the imitated natural stone contains naturally hydrated calcium sulphate, known under the name of gypsum. In another example, the use of hydrochloric acid would be suitable if the imitated stone contains calcium chloride.

Generalization to Acid Gases

In another process variant according to the invention, the carbon dioxide, also called carbonic acid gas, can be replaced with another weak acid gas. The advantage of a weak acid gas such as carbon dioxide is the reversibility of its action in water. In effect, the acid action of the dissolution of the carbon dioxide in water is reversed by the degassing of the solution. And the overcarbonation reaction $(R_s)$ of the carbon dioxide on the metallic carbonate is also reversible. The presence of the carbon dioxide disappears from the global balance of the reaction, exactly as in the natural so-called petrifaction process. The carbon dioxide plays the role of a catalyst in the process according to the invention.

Other weak acid gases may thus play the role of the carbon dioxide.

Fillers Addition Variant

The calcareous thixotropic paste overcarbonated in this way may be mixed with fillers in the pressurized reactor. This way, the overcarbonated thixotropic paste is added to a mix of fillers among the siliceous and/or calcareous sand granulate, luminescent granulate, vegetal fibers, calcareous marine fossils, recycled products or also clay. The addition of fillers aims mainly to reproduce identically the nature of the imitated stones.

So the addition of siliceous sand and clay in the mix allows imitating perfectly the sandstone. The calcareous aggregates and the clay allow imitating calcareous stones such as marble or travertine. The calcareous marine sediments such as the shells allow imitating the calcareous stones formed from marine fossils. The vegetal fibers improve the insulating qualities of the material and the recycled products such as the polyethylene fibers allow improving the waterproofing qualities of the material. Luminescent, translucent (such as glass) or fluorescent fillers, for example absorbing the light with a wavelength comprised in the ultraviolet range to render it in the visible range allow imitating a variety of crystals especially used in decoration.

Addition of Additives

The thixotropic calcareous paste, possibly with the addition of such fillers, forms a homogeneous mix in the pressurized reactor. A mix of additives such as colorants, metallic oxides such as iron oxide, copper oxide, zinc and/or aluminium oxide, hardening agents such as metallic silicates, for example potassium silicate, hydrophobic agents such as silica ester, metallic stearates, siloxane or siloxo-organic compounds or perfluorinated acrylic copolymer compounds and water may be added to this homogeneous mix, the whole in determined proportional quantities. This last mix forms the final composition of the manufactured block of material.

The metallic oxides give a great specificity to the blocks of material they compose. They intervene in the reaction pattern according to the reaction:

$$MO + 2H_2CO_3 \Leftrightarrow M(HCO_3)_2 + H_2O \text{ with MO: metallic oxide}$$

They interact in the reactions involving the element M: $(R_3)$, $(R_s)$ $(R_4)$ and $(R_5)$. These metallic oxides exist in the composition of the natural stone. They provide for example the coloration, the hardness and the specificity of the natural marbles. The use of these oxides corresponds to the accurate imitation of the composition of the natural stone.

Potassium silicate is water-soluble and reacts with calcium, magnesium or with the metal ions in solutions according to the equation:

$$K_2SiO_2 + Ca(HCO_3)_2 \Rightarrow CaSiO_2 + 2KHCO_3 \text{ or}$$

$$K_2SiO_2 + M(HCO_3)_2 \Rightarrow MSiO_2 + 2KHCO_3 \text{ with}$$

$$2KHCO_3 \Leftrightarrow K_2CO_3 + H_2O + CO_2$$

M is an alkaline-earth element or a transition metal, chosen for example among Ca, Mg, Fe, Al, Zn, Cu In the case of a reaction with the majority metallic ion, calcium, the silicate forms a water-insoluble crystal whose Young's modulus is very high. This feature gives the mix an increased hardness and crushing strength.

Silica ester polymerizes in 180 days in contact with water. It creates a three-dimensional crystal lattice, which adds to the calcium or magnesium carbonate lattice. This three-dimensional siliceous lattice, which has been abundantly described in public literature, provides exceptional mechanical strength, hardness and waterproofness.

Shaping in the Mold

The third step of the process according to the invention is the formation of the block of material in the mold. The mix obtained previously is introduced in a sealed mold having a shape corresponding to the construction element to be produced and subjected to an imposed pressure constraint.

Within the framework of a test laboratory, the mold has at least two removable opposite sides. After closing it, the mold is subjected, on its removable sides, to the compression pressure $P_e$ of a press.

Within the framework of industrial manufacturing, the imposed constraint may be obtained by the hydraulic pressure $P_e$ of the high-pressure extruder pump of the homogeneous granular mix that is transferred from the pressurized reactor to the sealed mold.

It is also possible to use a deformable hydraulic chamber, for example made of rubber, located in the centre of the mold and which, subjected to an external hydraulic, pneumatic or mechanical pressure $P_e$, exerts an imposed pressure from the heart of the block of material towards the walls of the mold. A block of material produced using this process will show a hollow heart and outstanding heat and sound insulation abilities.

Finally, it is also possible to use an electrolytic system that produces a reaction whose volume expansion by crystallisation or dilatation exerts a pressure from the heart of the block of material towards the walls of the mold. This phenomenon is particularly known during crystallisations which are three-dimensional molecular arrangements.

The granular mix is thus compressed in order to obtain the cohesion of the sand grains. This compression pressure $P_e$ then reaches the shrinkage pressure having a value $P_{def}$, about 3 to 6 MPa. The gases are thus expelled from the mix and the water, which has been introduced in the optimal quantity, is distributed uniformly in the volume left free by the solid powders of the mix. A set of vents allows the excess carbon dioxide gas and water to get out of the mold. Nevertheless, this gaseous decompression is progressive and controlled by the size of the set of vents of the mold. So, the pressure exerted on the fluids at the maximum compression $P_e$ is the atmospheric pressure.

Exchange Reaction

By increasing the compression pressure $P_e$ above $P_{def}$, the compression constraint is transmitted to the solid grains, which are pressed against each other.

By increasing the compression pressure $P_e$ above a value of $P_{fix}$ comprised between approximately 5 to 50 Mpa, depending on the size of the calcareous sand grains and on the overcarbonation degree, the calcareous sand grains are pressed very strongly against each other in all three directions of space. The calcareous sand grains slide, wear and lose their shape by flattening to a smaller size in order to increase the specific exchange surface with the water and the dissolved species, in particular the metallic hydrogencarbonate. The compactness of the material in the mold increases. At this step of the process, a molecular exchange reaction is favored.

Metallic exchange reaction:

$MCO_3 + M'(HCO_3)_2 \Leftrightarrow M(HCO_3)_2 + M'CO_3 (R_4)$

M and M' are alkaline-earth elements or transition metals, chosen for example among:

Ca, Mg, Fe, Al, Zn, Cu $M CO_3$: metallic carbonate $M'(HCO_3)_2$: exchange metallic hydrogencarbonate $M(HCO_3)_2$: hydrogencarbonate conjugate $M'CO_3$: associated carbonate This so-called metallic carbonate exchange reaction ($R_4$) takes place more easily under constraint. The mix of crushed powders in the mold is made of a set of grains in contact with their close neighbours by means of small surfaces we call the contact surfaces. These surfaces are under the influence of a residual constraint force resulting from the compression of all of the grains. Locally, these tensions activate the sites in close proximity of the contact surfaces. There, the metallic carbonate molecules are under the influence of a force that favours their dissolution reaction in presence of hydrogencarbonate molecules, reacting as an acid according to the exchange reaction ($R_4$).

From this results a preferential activation of the exchange reaction at the contact surfaces of the grains under the action of a constraint. This preferential reaction at the contact surfaces produces the metallic hydrogencarbonate conjugate $M(HCO_3)_2$ and the associated metallic carbonate $M'CO_3$ in the immediate spatial environment of the contact point. The contact surface eventually erodes and flattens so that it becomes larger. This partial erosion is accompanied by a transport of the hydrogencarbonate conjugate $M(HCO_3)_2$ and associated carbonate $M'CO_3$ molecules in the close spaces that remained free.

Maximum Compactness

The upper surface of the mold, called punch or extractor, exerts a force transmitted by the press on the granular mix. It is important to monitor the reaction force of the mass of the granular mix under the initial pressure constraint $P_e$. In fact, the granular arrangement and above all the erosion at the contact surfaces and the local molecular transport lead to a decrease of the reaction force to the pressure constraint $P_e$. From this results an increase of the density of the mass of crushed powder forming the material and an evacuation of the new excess water through the vents of the mold.

To feed the dissolution reaction of the metallic carbonates, the increase of the constraint pressure $P_e$ reactivates the preferential dissolution sites on the sand grains until their protruding intergranular contact shapes, and thus the interstitial spaces, are reduced. As the exchange and dissolution reaction progresses, the production of metallic hydrogencarbonate conjugate $M(HCO_3)_2$ and the associated metallic carbonate $M'CO_3$ fill the intergranular spaces through the precipitation of the metallic carbonates in the spaces where they are not subjected to the constraint.

The increase of the compression pressure constraint $P_e$ may continue this way until obtaining a maximum compactness of the powders mix at a density $d_{max}$.

Electrolytic Stimulation

To facilitate and accelerate this exchange reaction ($R_4$) and obtain quickly a maximum compactness, an electrical generator using the metallic mass of the mold and a metallic electrode insulated from the mold and placed inside of the block of material create in the latter an electrolytic field. The metallic electrode is expendable. It may advantageously be consumed by dissolution. For example, the electrode, in the form of a thin folded grate, placed inside of the material, may be out of zinc. Under the action of the dissolved carbonic gas and under the action of a compression constraint imposed in the mold, the pasty mix is subjected to an electrical voltage U that generates a current of intensity I and frequency f.

If f=0, the current is called direct current. The expendable electrode is an anode, seat of an oxidation and connected to the positive terminal of the generator. In this case, the zinc anode taken here as an example oxides to form zinc oxide.

If f≠0, the current is alternating. The metallic exchange reaction ($R_4$) is activated. This reaction involves many species in solution: $M^{2+}$·$CO_3^{2-}$, $HCO_3^-$, $H^+$, $OH^-$ $$M\,CO_3 + M'(HCO_3)_2 \Leftrightarrow M(HCO_3)_2 + M'CO_3 \,(R_4)$$

M and M' are alkaline-earth elements or transition metals, chosen for example among:

Ca, Mg, Fe, Al, Zn, Cu
$M\,CO_3$: metallic carbonate
$M'(HCO_3)_2$: metallic hydrogencarbonate
$M(HCO_3)_2$: hydrogencarbonate conjugate
$M'CO_3$: associated dissolution carbonate The metallic exchange reaction ($R_4$) takes place more intensely under the forced influence of the alternating current upon the electrically charged ions, atoms or molecules: $M^{2+}$, $CO_3^{2-}$, $HCO_3^-$, $H^+$, $OH^-$ involved in the exchange reaction. So, the influence of an electrical current results in favouring the metallic exchange reaction ($R_4$) and the local transport of hydrogencarbonate conjugate $M(HCO_3)_2$ and associated carbonate $M'CO_3$ molecules. The frequency f is determined by the optimisation of the metallic exchange reaction ($R_4$). This optimisation depends on the size of the mold, on the shape and nature of the electrode, on the composition of the block of material, on the quantity of water, on the temperature.

In practice, the generator is used first with alternating current in order to facilitate the exchange reaction, then with direct current in order to consume the electrode.

Removing the Block of Material from the Mold

The last step, once the maximum compactness of the powders has been obtained, is the extraction of the block of material. The action of time, of temperature and of the drying induces the precipitation of the associated and conjugated metallic carbonates $$M(HCO_3)_2 \Leftrightarrow MCO_3 + H_2O + CO_2 \,(R_5) \text{ (release of gas)}$$

This reaction corresponds to the setting of the block of material.

M is an alkaline-earth element or a transition metal, chosen for example among Ca, Mg, Fe, Al, Zn, Cu The reaction ($R_5$) corresponds to the reverse reaction of reaction ($R_3$), which compensates it. It takes place as from the formation of metallic hydrogencarbonate, continues at the exit from the pressurized reactor and accelerates preferably as from the removal of the block of material from the mold. This reaction is predicted by the thermodynamic instability of the metallic hydrogencarbonate $M(HCO_3)_2$, which decomposes in a thermodynamically more stable compound, the metallic carbonate $M\,CO_3$, releasing carbonic gas $CO_2$ and water $H_2O$. The metallic carbonate crystallises and forms a binder between the sand grains with which the hydrogencarbonate was in contact. This solidification corresponds to the setting of the block of material and resembles in every respect the natural solidification called natural petrifaction.

The decomposition of the metallic hydrogencarbonate $M(HCO_3)_2$ is favoured in time and accelerated by the temperature T. In fact, the temperature increase accelerates the gaseous release of the carbon dioxide by a strong effect of volume expansion (dilatation of the gases). So, small carbonic gas inclusions grow larger, agglomerate and percolate through the porous lattice of the block of material. On the other hand, it is known in the literature that the solubility of carbon dioxide decreases with the increase of the temperature and that carbon dioxide is insoluble in water at a temperature above 80° C. When the block of material dries, the diminution of the quantity of water, which is the solvent of the carbon dioxide, forces the release of the carbon dioxide.

The formation and crystallisation of the metallic carbonate $MCO_3$ forms the binding element of the material from the corresponding metallic hydrogencarbonate. The displacement of the molecules of hydrogencarbonate $M(HCO_3)_2$ at the time of the exchange reaction ($R_4$) and their dissolution in close proximity of the contact surfaces of the neighbouring grains increase the crystallisation and fixation surface of the grains among each other.

The metallic carbonate $MCO_3$, made mainly of calcium carbonate $CaCO_3$, appears under several crystallographic forms. Calcite, the most current crystalline form, crystallises in the rhombohedral form, and aragonite crystallises in the orthorhombic form, while the vaterite form shows a hexagonal crystalline form. Calcium carbonate $CaCO_3$ precipitates first in its vaterite crystalline form, which is more soluble in water. Then gradually, the metallic carbonate adopts its definitive calcite form, which is very little soluble in water. Consequently, a curing period of 28 days is to be observed. As a consequence of the precipitation of the carbonates, this phenomenon creates a crystalline "bridge" between two or more grains. This is the endogenous binder.

So, this reaction reproduces at an industrial time scale the natural metamorphic reaction which takes place in several thousands of years in the geological layers, under the pressure of the upper layers and with the help of the carbon dioxide dissolved in the water. This is a pseudo-metamorphic dissolution, deformation and recrystallisation reaction under constraint. The carbon dioxide consumed during the reaction is given back at the end of the cycle. The carbon dioxide plays the role of a reaction catalyst. The calcium carbonate is the binder, it is called endogenous.

The various additives allow treating the block of material up to its heart right during its manufacture and reproducing the specific features (appearance, colour, granulometry) at the closest to the observations made on the natural stone to be imitated.

Water-only Carbonation Variant

In a variant of the process according to the invention, the crushed calcareous powders, added with fillers and additives as described previously, are mixed with a fraction of the mix water and then placed directly in the mold.

So the powders mix made of crushed calcareous sand containing calcium carbonate and/or magnesium carbonate mixed with granulate and siliceous and/or calcareous sand fillers, added with a mix of additives such as colorants, metallic oxides such as iron oxide, copper oxide, zinc and/or aluminium oxide, hardening agents such as metallic silicates, for example potassium silicate, hydrophobic agents such as silica ester, metallic stearates, siloxane or siloxo-organic compounds or perfluorinated acrylic copolymer compounds and water is introduced in the mold. The mold is then closed and located underneath the press.

Water is introduced in the pressurized reactor described previously. The carbon dioxide $CO_2$ gas or a gas containing carbon dioxide $CO_2$ is introduced through the inlet valve at a pressure higher than the zero pressure and dissolves in the water. The quantity of carbonic gas dissolved depends on the gas inlet pressure Peg and on the available quantity of water. The pressure Peg is preferably higher than 4 bars and usually used between 15 and 50 bars.

At this pressure, a high proportion of carbonic gas is dissolved in the water.

This principle is known in the carbonated soft drink industry. The carbonic gas dissolves in the water and reacts with the water to form the carbonic acid. The progress of this reaction conditions the quality of the block of material extracted at the end of the process.

the reaction temperature ($R_1$) is higher than 0° C. to avoid the gelation of the water. The dissolution of the carbonic gas in the water is improved at a low temperature.

Dissolution of the carbonic gas in water:

$$CO_2 + H_2O \Leftrightarrow H_2CO_3 (R_1)$$

Acid reaction of the carbonic acid $$H_2CO_3 + H_2O \Leftrightarrow H_3O^+ + HCO_3 (R_2)$$

During this reaction under pressure step, the carbon dioxide can be concentrated under its hydrous form: carbonic acid. According to ($R_1$), the $CO_2$ dissolved in the water forms with the latter carbonic acid $H_2CO_3$. It is liposoluble. It can be concentrated in the dissolved lipid phase or as an emulsion in water, for example an alcohol dissolved in water. This increases strongly the solubility of the carbon dioxide. This concentrated carbon dioxide is available for the overcarbonation reaction ($R_s$) even outside of the pressurized reactor.

A similar method consists in increasing the total quantity of dissolved carbon dioxide by adding to this reactor mix a strong base, for example KOH or $K_2CO_3$, so that the created carbonic acid is transformed into potassium hydrogencarbonate $KHCO_3$, which is more stable in solution, even depressurized. The quantity of strong base added is related to the carbon dioxide pressure in the reactor. It is added so that the pH in the solution, outside of the reactor, remains inside of the potassium hydrogencarbonate predominance area, between 6.37 and 10.33, and preferably close to 8.35.

This carbonic acid is introduced in the mold with the help of an injection pump and comes in contact with the powders, reacts with the metallic carbonates to form the associated metallic hydrogencarbonate according to the reactions described previously: ($R_1$) ($R_2$) and ($R_3$)

Then the compression and removal from the mold take place, as described previously ($R_4$) et ($R_5$).

Treatments after the Formation

The process according to the present invention comprises several possible treatments after the formation and the extraction of the block of material.

With Potassium Silicate

The potassium silicate treatment is the most efficient at the time of the step of removing the material from the mold. The block of material contains a significant quantity of very soluble calcium hydrogencarbonate in solution. This hydrogencarbonate reacts very strongly with the potassium silicate to form the calcium silicate, a stable, insoluble molecule, with a high hardening power.

$$K_2SiO_2 + Ca(HCO_3)_2 \Rightarrow CaSiO_2 + 2KHCO_3$$

$$2KHCO_3 \Leftrightarrow K_2CO_3 + H_2O + CO_2$$

This treatment is carried out by cyclic sprinkling of potassium silicate, by flowing or by immersion. Potassium silicate is available in the trade in a water-dissolved form at about 30% in mass. It can be used under this form or dissolved in more water.

Sodium silicate gives an analogous reaction, but it forms the same way the sodium carbonate, which crystallises releasing large white needles known by the persons skilled in the art as being nitre.

With Milk of Lime

In the past, in France, the natural stones carved in the quarries were soaked in milk of lime. This treatment after carbonation in the air reinforced the superficial layer of the natural stone. The stone cutters used to talk about re-creating the natural cullet of the stone, formed by the slow dissolution of material from the heart towards the outside surface of the stone. The same way, a protection treatment of the block of material obtained from the mold by our manufacturing process with milk of lime is advantageous. This supply of calcium oxide allows fixing and neutralising the external surface of the block of material in the form of calcium carbonate $CaCO_3$. The involved reactions are the following:

$$CaO + H_2O \Rightarrow Ca(OH)_2$$

$$CaO + CO_2 \Rightarrow CaCO_3$$

$$Ca(OH)_2 + CO_2 \Rightarrow CaCO_3 + H_2O$$

$$CaO + H_2CO_3 \Rightarrow CaCO_3 + H_2O$$

$$CaO + M(HCO_3)_2 \Rightarrow CaCO_3 + MCO_3 + H_2O$$

$$Ca(OH)_2 + M(HCO_3)_2 \Rightarrow CaCO_3 + MCO_3 + 2H_2O$$

This treatment is carried out by cyclic sprinkling of milk of lime, by flowing or by immersion. Ideally, the milk of lime used comes from a lime factory, but it may also be obtained by dissolution of 1 to 10 parts in mass of very fine white lime for 1 to 10 parts in mass of water. This is a surface treatment, since the milk of lime only penetrates a few millimetres in the block of material.

The whole of these reactions leads to the formation of calcium carbonate on the surface of the block of material through the fixation of the carbonic gas under its forms $CO_2$, $H_2CO_3$ or dissolved $HCO_3^-$. This treatment requires drying and curing for 28 days.

With Silica Ester

A second treatment after the formation of the block of material is the treatment by cyclic sprinkling, flowing or immersion in an organic silica ester solution. The organic silica ester solution is prepared by dilution of 1 to 10 parts in mass of silica ethyl ester in 1 to 100 parts in mass of an organic solvent, for example ethanol, hexane or white spirit.

The treatment is double, it provides an additional hardness and waterproofing of the block of material. The reaction is a polymerisation by partial hydrolysis of the functions of the ethoxyl group. This treatment by means of an organic solution reaches quickly the pores up to the heart of the block of material. This treatment strengthens the block of material for specific uses, foundations, substructures, coverings, floor pavements. After drying, curing for 180 days is necessary.

By Waterproofing

A third treatment relates to the superficial waterproofing of the block of material in order to promote further its hydrophobic qualities. This treatment is carried out using a solution in aqueous or organic phase of siloxane, siloxo-organic compounds or perfluorinated copolymer compounds, prepared by dissolving, in compliance with the processes known in the art of the trade, 1 to 15 parts in mass of active ingredient described above in 100 parts in mass of water or organic solvent, for example hexane. The treatment by cyclic spraying, flowing or immersion penetrates some millimetres in the porosities of the block of material. Waterproofing is efficient as from the drying of the block of material.

The invention claimed is:

1. A process of manufacturing a block of material for construction, the process comprising the steps of:
   mixing aggregates comprising at least one of calcium carbonate and magnesium carbonate with water to form an aqueous mixture;
   transfer the aqueous mixture in a pressurized, hermetically sealed reactor;
   introducing an acid gas or gas produced by an acid in the reactor in order to form at least one of calcium bicarbonate and magnesium bicarbonate reacting with at least one of calcium carbonate and magnesium carbonate from the mixing aggregates;

transferring the reaction product into a mold comprising a set of vents and increasing a compression pressure of the mold ($P_e$) to reach the shrinkage pressure ($P_{def}$) having a value of about 3 to 6 Mpa and allow the excess carbon dioxide gas and water to get out of the mold through the set of vents, increasing the compression pressure of the mold ($P_e$) above an inducing pressure value ($P_{fix}$) of between approximately 5 to 50 Mpa in order to induce an exchange reaction with the water and the dissolved species to favor dissolution at least of one of calcium carbonate and magnesium carbonate, and increasing the compression pressure of the mold ($P_e$) until obtaining a maximum compactness of the mix; and progressively depressurizing the mold and extracting the block of material obtained; and curing the block of material over a curing period during which at least one of the calcium bicarbonate and the magnesium bicarbonate crystallize in at least one of calcium carbonate and magnesium carbonate and create an endogenous binder between the grains to allow the solidification of the block of material obtained.

2. The process according to claim 1, further comprising the step of using at least one of carbon dioxide gas and gas containing carbon dioxide as the acid gas and the gas produced by an acid.

3. The process according to claim 1, further comprising the step of including a step of forming the aqueous mixture from aggregates of calcareous sand or rock comprising one of calcium carbonate and magnesium carbonate and water.

4. The process according to claim 1, further comprising the step of carrying out the addition introducing the acid gas in the water used to form the aqueous mixture, under dissolved forms carbonic acid, metallic bicarbonate, stabilized or not by a base or a lipidic mix before being added to the aqueous mix.

5. The process according to claim 1, further comprising the step of crushing the aqueous mixture in order to obtain an aqueous powder of grains with an average particle size of the order of the micrometers to produce an homogeneous thixotropic paste, and performing the crushing of the aqueous mixture at least one of before and during the pressurized reaction with the acid gas.

6. The process according to claim 1, further comprising the step of adding at least one filler to the aqueous mixture, the at least one filler is selected from the group consisting of:
 a) aggregates, siliceous sand and/or clay,
 b) aggregates, calcareous sand and/or clay,
 c) vegetal fibers,
 d) residues of calcareous marine sediments,
 e) luminescent, translucent or fluorescent fillers, and
 f) recycled products.

7. The process according to claim 1, further comprising the step of adding at least one additive to the aqueous mixture, the at least one additive is selected from the group consisting of:
 a) a colorant,
 b) a metallic oxide,
 c) a metallic silicate, and
 d) a hydrophobic agent.

8. The process according to claim 6, further comprising the step of adding at least one filler before at least one of the fine crushing step, during the step of pressurized reaction with the gas and before the transfer in the mold.

9. The process according to claim 7, further comprising the step of adding at least one additive before at least one of the fine crushing step, during the step of pressurized reaction with the gas and before the transfer in the mold.

10. The process according to claim 1, further comprising the step of removing the block of material from the mold and treating the removed block of material with one or more solutions selected from the group consisting of:
 a) a potassium silicate solution,
 b) a milk of lime solution,
 c) a silica ester solution, and
 d) a solution of siloxane, silo-organic compounds or per fluorinated copolymer compounds.

11. The process according to claim 1, further comprising the step of removing the block of material from the mold and successively treating the removed block of material with at least two solutions selected from the group consisting of:
 a) a potassium silicate solution,
 b) a milk of lime solution,
 c) a silica ester solution, and
 d) a solution of siloxane, silo-organic compounds or per fluorinated copolymer compounds.

12. The process according to claim 1, further comprising the step of, during the compression step in the mold, carrying out an electrolysis using a metallic mass of the mold and a metallic electrode insulated from the mold and located in the block of material for creating an electrolytic field in the mold.

13. The process according to claim 5, further comprising the step of crushing the aqueous mixture in order to obtain the aqueous powder with grains having an average particle size smaller than one millimeter.

14. A process of manufacturing a block of material for construction, the process comprising the steps of:
 mixing aggregates with water to form an aqueous mixture, the aggregates comprising at least one of calcium carbonate and magnesium carbonate;
 transferring the aqueous mixture into a pressurized, hermetically sealed reactor;
 introducing either an acid gas or a gas produced by an acid into the reactor to form at least one of calcium bicarbonate and magnesium bicarbonate to obtain a reaction product;
 transferring the reaction product into a mold comprising a set of vents and increasing a compression pressure of the mold and, during the increase of the compression pressure of the mold, carrying out an electrolysis using a metallic mass of the mold and a metallic electrode insulated from the mold and located in the block of material for creating an electrolytic field in the mold; and
 progressively depressurizing the mold and extracting the block of material there from.

15. The process according to claim 14, further comprising the step of using at least one of carbon dioxide gas and a gas containing carbon dioxide as the acid gas and the gas produced by an acid.

16. The process according to claim 14, further comprising the step of forming the aqueous mixture by mixing water with aggregates of either calcareous sand or rock comprising one of calcium carbonate and magnesium carbonate.

17. The process according to claim 14, further comprising the step of introducing the acid gas to the water used to form the aqueous mixture, under dissolved forms carbonic acid, metallic bicarbonate, either stabilized or not by either a base or a lipidic mix before forming the aqueous mixture.

18. The process according to claim 14, further comprising the step of crushing the aqueous mixture to obtain an aqueous powder of grains having an average particle size of the order of the micrometers, and the step of crushing the aqueous mixture at least one of before and during the pressurized reaction with the acid gas.

19. The process according to claim 14, further comprising the step of adding at least one filler to the aqueous mixture, the at least one filler is selected from the group consisting of:
   a) aggregates, siliceous sand and/or clay,
   b) aggregates, calcareous sand and/or clay,
   c) vegetal fibers,
   d) residues of calcareous marine sediments,
   e) luminescent, translucent or fluorescent fillers, and
   f) recycled products.

20. The process according to claim 14, further comprising the step of adding at least one additive to the aqueous mixture, the at least one additive is selected from the group consisting of:
   a) a colorant,
   b) a metallic oxide,
   c) a metallic silicate, and
   d) a hydrophobic agent.

* * * * *